United States Patent
Zhou

(10) Patent No.: US 9,471,122 B2
(45) Date of Patent: Oct. 18, 2016

(54) POWER SUPPLY CIRCUIT FOR OPERATING A FIRST AND SECOND POWER CIRCUITS FOR SUPPLYING POWER TO A CPU WHEN THE COMPUTER IS TURNED ON AND DOES NOT OPERATE THE SECOND POWER CIRCUIT WHEN THE COMPUTER IS IN A STANDBY MODE

(71) Applicant: ScienBiziP Consulting (Shen Zhen) Co., Ltd., Shenzhen (CN)

(72) Inventor: Hai-Qing Zhou, Shenzhen (CN)

(73) Assignee: ScienBiziP Consulting(Shenzhen)Co.,Ltd., Shenzhen (CN)

( * ) Notice: Subject to any disclaimer, the term of this patent is extended or adjusted under 35 U.S.C. 154(b) by 130 days.

(21) Appl. No.: 14/262,969

(22) Filed: Apr. 28, 2014

(65) Prior Publication Data

US 2015/0033040 A1 Jan. 29, 2015

(30) Foreign Application Priority Data

Jul. 24, 2013 (CN) .......................... 2013 1 03119766

(51) Int. Cl.
*G06F 1/00* (2006.01)
*G06F 1/26* (2006.01)
*G06F 1/28* (2006.01)

(52) U.S. Cl.
CPC .. *G06F 1/26* (2013.01); *G06F 1/28* (2013.01)

(58) Field of Classification Search
CPC .......... G06F 1/26; G06F 1/28; G06F 1/3203; G06F 1/00; G06F 2101/00
USPC .................. 713/320, 330, 300, 323; 363/37; 323/290, 283; 307/31
See application file for complete search history.

(56) References Cited

U.S. PATENT DOCUMENTS

| | | | |
|---|---|---|---|
| 5,691,163 A * | 11/1997 | Cameron | C12N 15/52 435/183 |
| 8,543,859 B2 * | 9/2013 | Chueh | G06F 1/28 326/93 |
| 2005/0083066 A1* | 4/2005 | Tani | G06F 1/28 324/509 |
| 2006/0075270 A1* | 4/2006 | Seo | G06F 1/3203 713/320 |
| 2009/0287947 A1* | 11/2009 | DuBose | G06F 1/28 713/323 |
| 2010/0162010 A1* | 6/2010 | Su | H02M 1/34 713/300 |
| 2010/0211811 A1* | 8/2010 | Zhou | G06F 1/26 713/330 |
| 2010/0321102 A1* | 12/2010 | Kong | H03K 19/0016 327/544 |
| 2011/0084552 A1* | 4/2011 | Færevaag | H02J 1/10 307/31 |
| 2011/0095743 A1* | 4/2011 | Zhou | G11C 5/147 323/290 |
| 2013/0163293 A1* | 6/2013 | Zou | H02M 3/1588 363/37 |
| 2013/0278060 A1* | 10/2013 | Tong | H02J 1/00 307/31 |
| 2014/0203793 A1* | 7/2014 | Lai | H02M 1/44 323/283 |

* cited by examiner

*Primary Examiner* — Aurel Prifti
(74) *Attorney, Agent, or Firm* — ScienBiziP, P.C.

(57) ABSTRACT

A power supply circuit for supplying power to a central processing unit (CPU) of a computer includes a pulse width modulation (PWM) controller, a control circuit, a switch circuit, a first current protection circuit, a second current protection circuit, a first power circuit, and a second power circuit. When the computer is turned on, a first current protection threshold is set by the PWM controller through the first current protection circuit. When the computer is in a standby mode, a second current protection threshold is set by the PWM controller through the second current protection circuit.

7 Claims, 1 Drawing Sheet

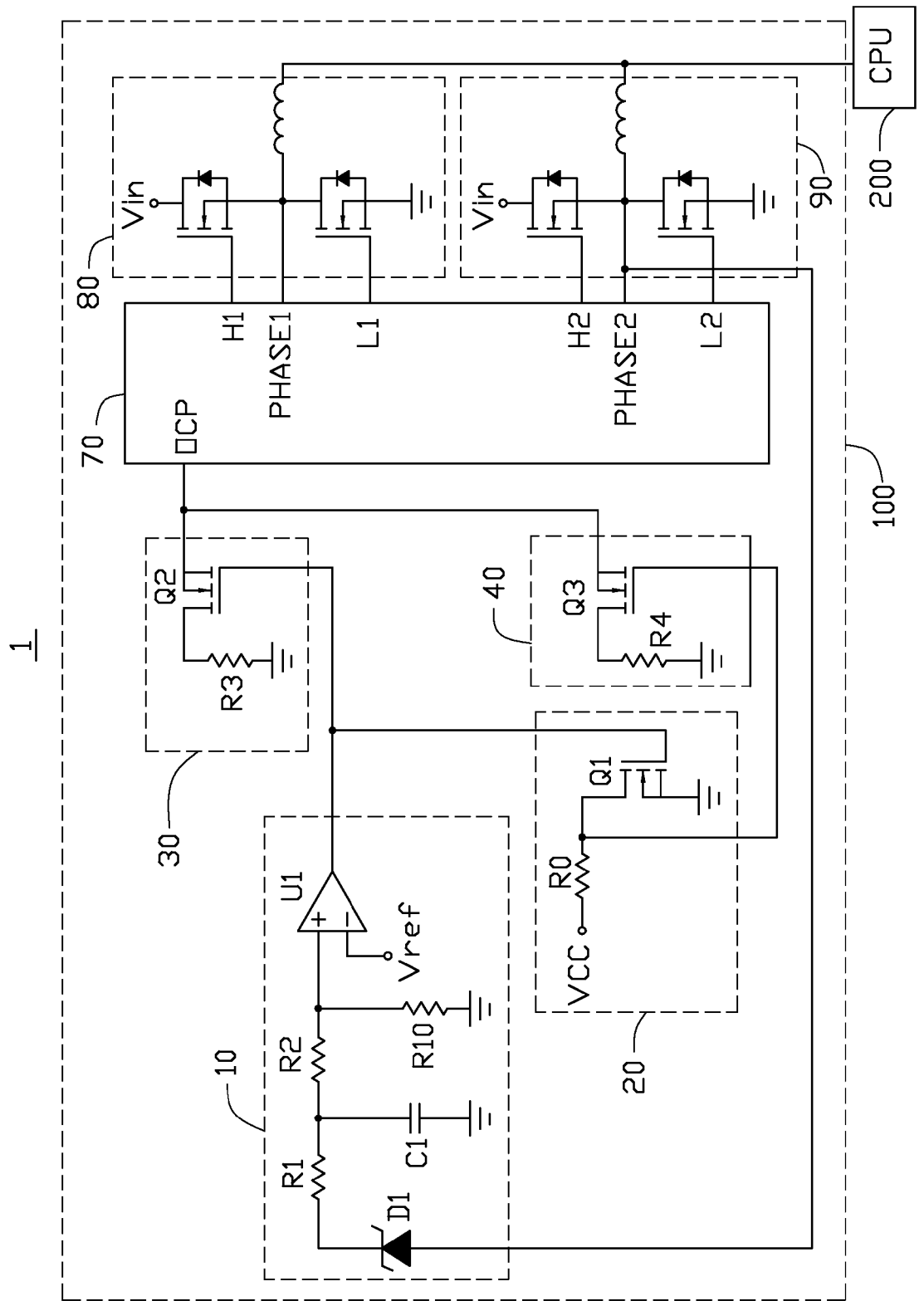

POWER SUPPLY CIRCUIT FOR OPERATING A FIRST AND SECOND POWER CIRCUITS FOR SUPPLYING POWER TO A CPU WHEN THE COMPUTER IS TURNED ON AND DOES NOT OPERATE THE SECOND POWER CIRCUIT WHEN THE COMPUTER IS IN A STANDBY MODE

FIELD

The present disclosure relates to power supply circuits, and particularly to a power supply circuit for providing voltage to a central processing unit (CPU).

BACKGROUND

Many power circuits are arranged on a motherboard of a computer for providing voltages and currents to a CPU. All power circuits operate when the computer is powered on, but only one power circuit operates when the computer is in a standby mode. Different power circuits provide different voltages and currents to the CPU when the motherboard operates at different states.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the presented embodiments.

The FIGURE is a circuit diagram of a power supply circuit of an embodiment for a central processing unit.

DETAILED DESCRIPTION

The disclosure, including the FIGURE, is illustrated by way of example and not by way of limitation. References to "an" or "one" embodiment in this disclosure are not necessarily to the same embodiment, and such references mean "at least one". Although discussion herein is directed to a computer, it will be understood the principles described can be utilized with other e-devices.

The FIGURE illustrates an embodiment of a power supply circuit 100. The power supply circuit 100 is arranged on a motherboard of a computer 1, to provide voltages to a CPU 200 of the computer 1. The power supply circuit 100 includes a control circuit 10, a switch circuit 20, a first current protection circuit 30, a second current protection circuit 40, a pulse width modulation (PWM) controller 70, a first power circuit 80 connected to a first output terminal of the PWM controller 70, and a second power circuit 90 connected to a second output terminal of the PWM controller 70.

When the computer 1 is turned on, the first and second power circuits 80 and 90 both operate. When the second power circuit 90 operates, the control circuit 10 receives a pulse signal from the PWM controller 70 and converts the pulse signal into a direct current (DC) voltage, and compares the DC voltage with a preset voltage and outputs a first control signal to the switch circuit 20 and the first current protection circuit 30. The switch circuit 20 is turned on and the second current protection circuit 40 is turned off. The first current protection circuit 30 is turned on. A first current protection threshold is set by the PWM controller 70 through the first current protection circuit 30. When the computer 1 is powered off, the first power circuit 80 operates and the second power circuit 90 does not operate. The control circuit 10 does not receive a pulse signal from the PWM controller 70 and outputs a second control signal to the switch circuit 20 and the first current protection circuit 30. The switch circuit 20 is turned off and the second current protection circuit 40 is turned on. The first current protection circuit 30 is turned off. A second current protection threshold is set by the PWM controller 70 through the second current protection circuit 40.

The control circuit 10 includes resistors R1, R2, and R10, a capacitor C1, a diode D1, and a comparator U1. An anode of the diode D1 is connected to the second output terminal of the PWM controller 70. A cathode of the diode D1 is connected to a non-inverting input terminal of the comparator U1 through the resistors R1 and R2 in series. A first end of the capacitor C1 is connected to a node between the resistors R1 and R2. A second end of the capacitor C1 is grounded. A first end of the resistor R10 is connected to a node between the resistor R2 and the non-inverting input terminal of the comparator U1. A second end of the resistor R10 is grounded. An inverting input terminal of the comparator U1 is connected to a reference power source Vref. An output terminal of the comparator U1 is connected to the switch circuit 20 and the first current protection circuit 30.

The switch circuit 20 includes an electronic switch Q1 and a resistor R0. A first terminal of the electronic switch Q1 is connected to the output terminal of the comparator U1. A second terminal of the electronic switch Q1 is connected to the second current protection circuit 40, and also connected to a power source VCC through the resistor R0. A third terminal of the electronic switch Q1 is grounded.

The first current protection circuit 30 includes an electronic switch Q2 and a resistor R3. A first terminal of the electronic switch Q2 is connected to the output terminal of the comparator U1. A second terminal of the electronic switch Q2 is grounded through the resistor R3. A third terminal of the electronic switch Q2 is connected to a current pin OCP of the PWM controller 70.

The second current protection circuit 40 includes an electronic switch Q3 and a resistor R4. A first terminal of the electronic switch Q3 is connected to the second terminal of the electronic switch Q1. A second terminal of the electronic switch Q3 is grounded through the resistor R4. A third terminal of the electronic switch Q3 is connected to the current pin OCP of the PWM controller 70.

In the embodiment shown in the FIGURE, the current protection threshold is set by PWM controller 70 according to the resistance of the current pin OCP. The resistance of the resistor R3 determines the first current protection threshold, and the resistance of the resistor R4 determines the second current protection threshold. The resistance of the resistor R3 is different from the resistance of the resistor R4.

In use, when the computer 1 is turned on, the first and second power circuits 80 and 90 operate. Thus, the PWM controller 70 outputs pulse signals to the first and second power circuits 80 and 90. The pulse signal output from the second output terminal of the PWM controller 70 is provided to the control circuit 10 and converted into a DC voltage through the resistor R1 and the capacitor C1. The DC voltage is divided through the resistors R2 and R10, and then provided to the non-inverting input terminal of the comparator U1. Because the voltage of the non-inverting input terminal of the comparator U1 is greater than the preset voltage Vref of the inverting input terminal of the comparator U1, the comparator U1 outputs a high-level signal, such as logic 1. The high-level signal turns on the electronic switches Q1 and Q2. The electronic switch Q3 receives a low-level signal, such as logic 0, from the second terminal of the electronic switch Q1 when the electronic switch Q1 is turned on. The low-level signal turns off the electronic switch Q3. When the electronic switch Q2 is turned on, the current pin OCP of the PWM controller 70 is grounded through the resistor R3, and the PWM controller 70 sets the first current protection threshold for the power supply circuit 100 according to the resistance of the resistor R3.

When the computer 1 is in a standby mode, the first power circuit 80 operates while the second power circuit 90 does not operate. Thus, the PWM controller 70 only outputs a pulse signal to the first power circuit 80. The non-inverting input terminal of the comparator U1 does not receive a voltage and outputs a low-level signal. The low-level signal turns off the electronic switches Q1 and Q2. The electronic switch Q3 receives a high-level signal from the second terminal of the electronic switch Q1 when the electronic switch Q1 is turned off. The high-level signal turns on the electronic switch Q3. When the electronic switch Q3 is turned on, the current pin OCP of the PWM controller 70 is grounded through the resistor R4, and the PWM controller 70 sets the second current protection threshold for the power supply circuit 100 according to the resistance of the resistor R4.

The power supply circuit 100 can use different current protection thresholds when the computer 1 works at different states. When the computer 1 is turned on, the PWM controller 70 sets the first current protection threshold for the power supply circuit 100 according to the resistance of the resistor R3. When the computer 1 is in a standby mode, the PWM controller 70 sets the second current protection threshold for the power supply circuit 100 according to the resistance of the resistor R4. Therefore, the power supply circuit 100 prevents the CPU 200 from being damaged.

In at least one embodiment, each of the electronic switches Q1-Q3 is an n-channel field-effect transistor (FET), and the first terminal, the second terminal, and the third terminal of each of the electronic switches Q1-Q3 are a gate, a source, and a drain of the FET, respectively. In at least one embodiment, each of the electronic switches Q1-Q3 can be an npn bipolar junction transistor (BJT). In other embodiments, each of the electronic switches Q1-Q3 can be other switches having similar functions.

Even though numerous characteristics and advantages of the disclosure have been set forth in the foregoing description, together with details of the structure and function of the disclosure, the disclosure is illustrative only, and changes may be made in detail, including in the matters of shape, size, and arrangement of parts within the principles of the disclosure. The embodiments described herein are illustrative and are not intended to limit the following claims.

What is claimed is:

1. A power supply circuit for supplying power to a central processing unit (CPU) of a computer, the power supply circuit comprising:
   a pulse width modulation (PWM) controller comprising a first output terminal, a second output terminal, and a current pin;
   a control circuit connected to the second output terminal of the PWM controller;
   a switch circuit connected to the control circuit;
   a first current protection circuit connected to the current pin of the PWM controller and the control circuit;
   a second current protection circuit connected to the switch circuit and the current pin of the PWM controller;
   a first power circuit connected to the first output terminal of the PWM controller and the CPU; and
   a second power circuit connected to the second output terminal of the PWM controller and the CPU;
   wherein when the computer is turned on, the first and second power circuits operate, the control circuit receives a pulse signal from the second output terminal of the PWM controller and converts the pulse signal to a direct current (DC) voltage, compares the DC voltage with a preset voltage, and outputs a first control signal to the switch circuit and the first current protection circuit, the switch circuit is turned on and the second current protection circuit is turned off, the first current protection circuit is turned on, and a first current protection threshold is set by PWM controller through the first current protection circuit; and when the computer in a standby mode, the first power circuit operates and the second power circuit does not operate, the control circuit does not receive a pulse signal from the PWM controller and outputs a second control signal to the switch circuit and the first current protection circuit, the switch circuit is turned off and the second current protection circuit is turned on, the first current protection circuit is turned off, and a second current protection threshold is set by PWM controller through the second current protection circuit.

2. The power supply circuit of claim 1, wherein the control circuit comprises a first resistor, a second resistor, and a third resistor, a first capacitor, a diode, and a comparator, an anode of the diode is connected to the second output terminal of the PWM controller, a cathode of the diode is connected to a non-inverting input terminal of the comparator through the first and second resistors connected in series, a first end of the first capacitor is connected to a node between the first and second resistors, a second end of the first capacitor is grounded, a first end of the third resistor is connected to a node between the second resistor and the non-inverting input terminal of the comparator, a second end of the third resistor is grounded, an inverting input terminal of the comparator is connected to a reference power source, and an output terminal of the comparator is connected to the first and third switch circuits.

3. The power supply circuit of claim 2, wherein the switch circuit comprises a first electronic switch and a fourth resistor, a first terminal of the first electronic switch is connected to the output terminal of the comparator, a second terminal of the first electronic switch is connected to the second current protection circuit and also connected to a power source through the fourth resistor, and a third terminal of the first electronic switch is grounded.

4. The power supply circuit of claim 3, wherein the first current protection circuit comprises a second electronic switch and a fifth resistor, a first terminal of the second electronic switch is connected to the output terminal of the comparator, a second terminal of the second electronic switch is grounded through the fifth resistor, and a third terminal of the second electronic switch is connected to the current pin of the PWM controller.

5. The power supply circuit of claim 4, wherein the second current protection circuit comprises a third electronic switch, and a sixth resistor, a first terminal of the third electronic switch is connected to the second terminal of the first electronic switch, a second terminal of the third electronic switch is grounded through the sixth resistor, and a third terminal of the third electronic switch is connected to the current pin of the PWM controller.

6. The power supply circuit of claim 5, wherein resistance of the fifth resistor is different from resistance of the sixth resistor.

7. The power supply circuit of claim 5, wherein the first to third electronic switches are n-channel field effect transistors (FETs), and the first to third terminals of the first to third electronic switches correspond to gates, sources, and drains of the FETs.

* * * * *